United States Patent [19]

Heisel et al.

[11] Patent Number: 5,676,921

[45] Date of Patent: Oct. 14, 1997

[54] METHOD FOR THE RECOVERY OF ELEMENTAL SULFUR FROM A GAS MIXTURE CONTAINING $H_2S$

[75] Inventors: Michael Heisel, Pullach; Freimut Marold, Ahornwohlbach; Martin Gwinner, Hohenschäftlarn, all of Germany

[73] Assignee: Linde Aktiengesellschaft, Germany

[21] Appl. No.: 654,777

[22] Filed: May 29, 1996

Related U.S. Application Data

[63] Continuation of Ser. No. 405,343, Mar. 16, 1995, abandoned.

[30] Foreign Application Priority Data

Mar. 17, 1994 [DE] Germany ............... 44 09 203.2

[51] Int. Cl.⁶ .................................................. B01D 53/52
[52] U.S. Cl. ................... 423/573.1; 423/224; 423/242.1; 423/244.09; 423/576.8
[58] Field of Search ..................... 423/224, 242.1, 423/244.09, 567.1, 573.1, 576, 576.8

[56] References Cited

U.S. PATENT DOCUMENTS

| | | | |
|---|---|---|---|
| 3,424,560 | 1/1969 | Carmassi et al. | 423/567.1 |
| 3,752,877 | 8/1973 | Beavon | 423/573.1 |
| 4,507,275 | 3/1985 | Reed | 423/574 R |
| 4,552,746 | 11/1985 | Kettner et al. | 423/573 G |
| 4,957,724 | 9/1990 | Marold et al. | 423/574 R |
| 4,988,494 | 1/1991 | Lagas et al. | 423/574 R |
| 5,202,107 | 4/1993 | Kvasnikoff et al. | 423/574 R |
| 5,262,135 | 11/1993 | Lell et al. | 423/220 |

FOREIGN PATENT DOCUMENTS

| | | | |
|---|---|---|---|
| 749277 | 12/1966 | Canada | 423/576.8 |
| 2089263 | 2/1992 | Canada | |
| 8800525 | 10/1989 | Netherlands | 423/573.1 |
| WO9002096 | 3/1990 | WIPO | |

OTHER PUBLICATIONS

English translation of Netherlands patent 8,800,525 by applicant Elektroschmelzwerk Delfzijl B.V. open to public inspection on 02 Oct. 1989.

M. P. Heisel et al., Clinsulf-Do® for sulphur recovery from gases containing hydrogen sulphide. Reports on Science and Technology, No. 53, 1994, pp. 15-19 (No Month).

B. Gene Goar, Tail Gas Cleanup Process Technology, Energy Progress, vol. 6, No. 2, Jun. 1986, pp. 84-90.

Hydrocarbon Processing, Gas Process Handbook '90, Apr. 1990, pp. 88 and 97.

Michael Heisel et al., The Clinsulf® Sub-Dew-Point Process for Sulphur Recovery, Reports on Science and Technology, No. 44, 1988, pp. 33-38 (No Month).

Primary Examiner—Gary P. Straub
Assistant Examiner—Timothy C. Vanoy
Attorney, Agent, or Firm—Webb Ziesenheim Bruening Logsdon Orkin & Hanson, P.C.

[57] ABSTRACT

This invention is a method for the recovery of elemental sulfur from a gas mixture containing $H_2S$. The gas mixture is first subjected to desulfurization in a Claus installation which has a thermal part and a catalytic part resulting in the recovery of elemental sulfur. Sulfur compounds still contained in the Claus tail gas are then transformed into $H_2S$ by means of hydrogenation and, if necessary, by means of hydrolysis and the hydrogenated Claus tail gas is subjected to catalytic direct oxidation of the $H_2S$ to elemental sulfur. The Claus installation comprises exactly one catalytic stage and the catalytic direct oxidation also takes place in exactly one reactor. Sulfur recovery rates of 99.3% to 99.6% are achieved by the method of the invention.

10 Claims, 1 Drawing Sheet

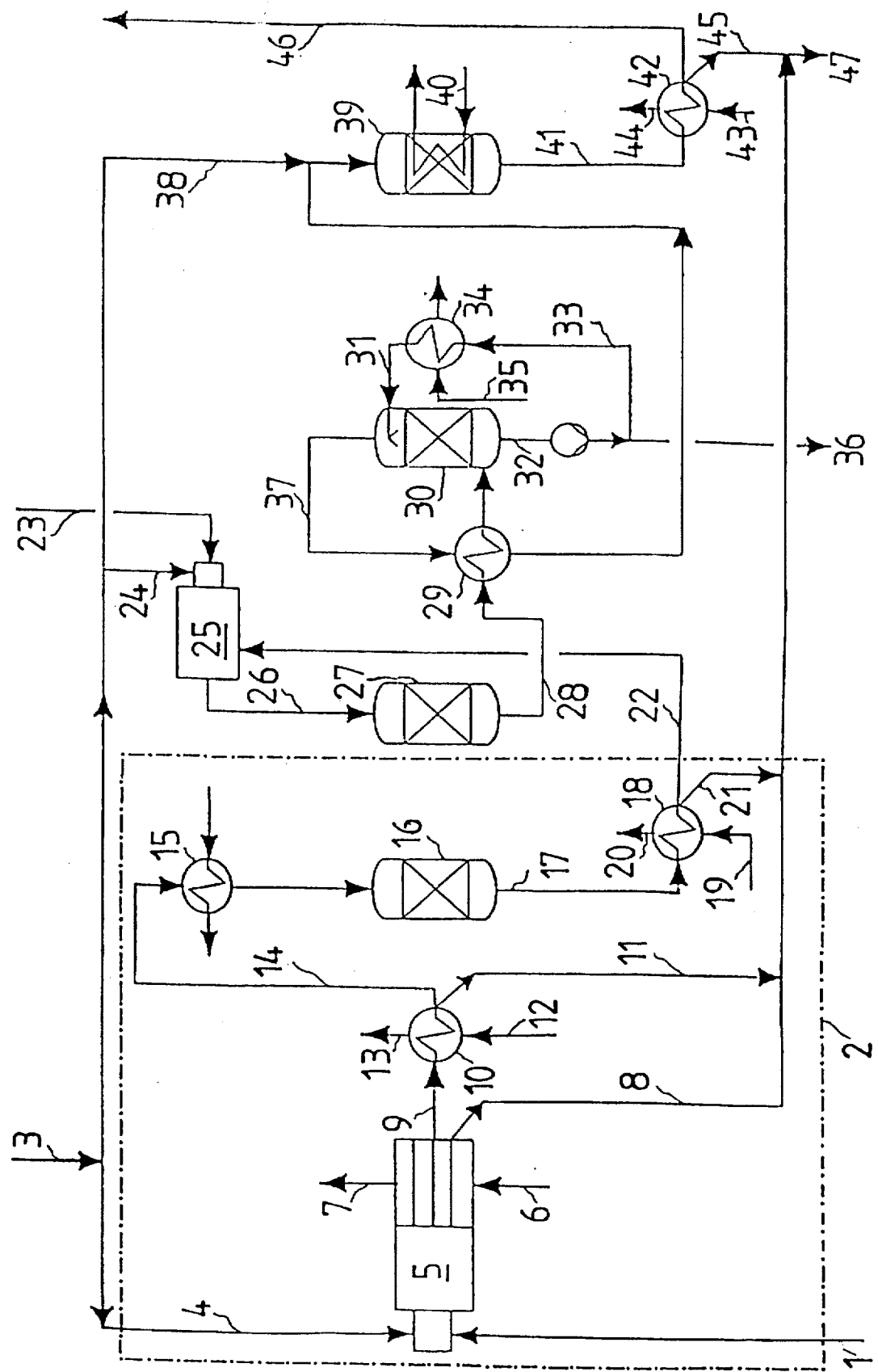

METHOD FOR THE RECOVERY OF ELEMENTAL SULFUR FROM A GAS MIXTURE CONTAINING $H_2S$

This is a continuation of application Ser. No. 08/405,343 filed on Mar. 16, 1995 now abandoned.

BACKGROUND OF THE INVENTION

1. Field of the Invention

This invention relates generally to a method for the recovery of elemental sulfur from a gas mixture containing $H_2S$ and, more particularly, to a method of recovering elemental sulfur from a gas mixture containing $H_2S$ wherein the gas mixture is first subjected to desulfurization in a Claus installation.

2. Description of the Prior Art

The use of Claus installations in the treatment of gas mixtures containing $H_2S$ has long been a part of the prior art. Claus installations are particularly well-suited for the treatment of gases which contain large amounts of $H_2S$.

A conventional Claus installation includes a thermal part and a catalytic part. The thermal part of the Claus installation consists essentially of a Claus furnace. In the Claus furnace, into which air is introduced, a portion of the $H_2S$ contained in the raw gas is burned, which results in the formation of $SO_2$.

The catalytic part is connected to the thermal part of the Claus installation. The catalytic part of the Claus installation consists of several—generally two or three—catalytic Claus stages. In the catalytic Claus stages, the $SO_2$ formed during combustion reacts with $H_2S$ according to the Claus reaction:

$$2\ H_2S + SO_2 = 3/x\ S_x + 2\ H_2O + \text{Heat} \tag{1}$$

To achieve the highest possible rate of sulfur recovery, the combustion is performed in the Claus furnace so that one-third of the $H_2S$ is burned to form $SO_2$.

Under pressure from increasingly strict environmental requirements and in an attempt to further increase sulfur recovery rates, numerous methods have been developed which employ additional processes to clean the Claus tail gas. Although an increase of the sulfur recovery rate by means of an additional treatment of the Claus tail gas leads to additional production of valuable sulfur, the capital investment costs required for the additional cleanup and/or desulfurization of the Claus tail gas far exceed the profits which can be earned from the additional production of sulfur.

The methods which have long been known in the prior art and which are the most important for cleaning the Claus tail gas can essentially be divided into the SubDewPoint Methods (SDP Methods), the recycle methods and the direct oxidation methods. An overview of the various methods which can be used to clean the Claus tail gas is presented, for example, in the article entitled "Tail Gas Cleanup Method Technology", which appeared in *Energy Progress*, Volume 6, No. 2, June 1986, pages 84 to 90.

The SULFREEN Method represents one example of the SDP Methods. SDP Methods can be used to achieve sulfur recovery rates up to 99.6%. One problem with these methods is that changes in the composition of the raw gas or in the quantity of the raw gas inevitably lead to reductions in the sulfur yield and to increased emissions. These problems are due to the fact that the optimal level of air injection into the Claus furnace can only be determined at the end of the installation by means of an Air Demand Analyzer (ADA). By the time the ADA detects the change, the disruption has already passed through the entire installation. Consequently, the sulfur yield drops below the maximum sulfur recovery rate of 99.6% for the SDP Methods. In practice, therefore, SDP units achieve long-term average sulfur recovery rates of only 99.1% to 99.3%.

The SCOT Method and the CLINTOX Method are examples of recycle methods. The recycle methods have the advantage of a uniformly high sulfur recovery rate of greater than 99.8%. The disadvantage of the recycle methods lies in their very high costs, since they include a gas scrubbing in an absorption column with the accompanying regeneration of the absorbent used in the gas scrubber. It is therefore significantly more expensive to use a recycle method to clean Claus tail gas than to use competing methods. Consequently, recycle methods are used only in a few cases, namely, where the environmental laws and regulations are extraordinarily strict and require sulfur recovery rates which were heretofore possible only using recycle methods.

The direct oxidation methods represent a compromise between the SDP Methods and the recycle methods with regard to costs and to sulfur recovery rate. Examples of direct oxidation methods include the BSR/SELECTOX Method, the MODOP Method and the SUPERCLAUS Method. The MODOP Method and the SUPERCLAUS Method are described, for example, in "Hydrocarbon Processing", April 1990, *Gas Process Handbook* '90, pages 88 and 97. In the SUPERCLAUS Method, the Claus tail gas is injected into a reactor in which a selective direct oxidation of the $H_2S$ into elemental sulfur takes place. In the BSR/SELECTOX Method and in the MODOP Method, the Claus tail gas is reduced and/or hydrogenated in a reactor. The hydrogenation stage is followed by quench cooling. Following water scrubbing in the quench cooler, air is added to the tail gas and the mixture is injected into a direct oxidation reactor in which $H_2S$ is selectively oxidized to elemental sulfur according to the reaction equation for direct oxidation:

$$2\ H_2S + O_2 = 2/x\ S_x + 2\ H_2O + \text{Heat} \tag{2}$$

The direct oxidation reactor for the MODOP Method can be designed to include a single stage or two stages with the interposition of a sulfur condensation step. The BSR/SELECTOX Method can achieve a sulfur recovery rate of 98.5% to 99%. With the SUPERCLAUS Method downstream of a three-stage Claus installation, a sulfur yield of 99% can be achieved. With the MODOP Method, the sulfur recovery rate can be increased to 99.5%.

General information on methods of the prior art for the cleanup of the Claus tail gas, as well as specific information on the MODOP Method and the SUPERCLAUS Method, are disclosed in U.S. Pat. Nos. 4,552,746 and 4,988,494.

As a rule, in the SDP Methods, the recycle methods and the direct oxidation methods, the tail gas which is formed after the recovery of the sulfur is transported to an afterburning stage.

The article entitled "The CLINSULF® Sub-Dew-Point Process for Sulfur Recovery", *Linde Reports on Science And Technology*, No. 44, 1988, pages 33 to 38, discloses the use of an internally-cooled reactor (CLINSULF reactor) for the catalytic recovery of sulfur at temperatures below the sulfur dew point or even below the sulfur solidification point. In the CLINSULF Method, one or more internally-cooled reactors are used in connection with the Claus furnace in place of the adiabatically-operated Claus reactors.

In summary, it can be stated that the prior art includes numerous methods which can be performed downstream of a multi-stage Claus installation by means of which a Claus tail gas can be cleaned with a high total sulfur recovery rate. The multi-stage Claus installation is generally designed as a two-stage or even a three-stage Claus installation. For purposes of the specification and claims, a two-stage or three-stage Claus installation is defined as a Claus installation which, in addition to the thermal Claus stage, comprises two or three catalytic Claus stages (i.e., two or three Claus reactors).

An object of this invention is to provide a method of the type described above which comprises a Claus installation with subsequent cleaning of the Claus tail gas which guarantees a sulfur recovery rate greater than 99% and which is characterized by low costs. The costs in question include the capital investment costs, but consist above all in the operating costs.

SUMMARY OF THE INVENTION

The objects of the invention are accomplished by a method in which the Claus installation comprises exactly one catalytic stage and in which the catalytic direct oxidation takes place in exactly one reactor.

Surprisingly, it has been discovered that cleaning a Claus tail gas by means of a one-stage Claus installation (one thermal Claus stage and one catalytic Claus stage) and by means of a direct oxidation of the $H_2S$ into elemental sulfur, a sulfur recovery rate of more than 99.3% can be achieved in only one single reactor following hydrogenation. The high sulfur recovery rate can also be achieved as a long-term average, if the method claimed by the invention is used. Using the methods of the prior art, a sulfur recovery rate of more than 99% was possible only if the Claus installation upstream of the cleaning of the Claus tail gas contained at least two or more catalytic stages and the direct oxidation took place in several stages.

The catalytic reactor of the one-stage Claus installation according to the invention is preferably operated, in particular, at the outlet of the reactor, at a temperature which is close to the sulfur dew point. This type of operation is effective and particularly advantageous because in the Claus reaction as described in Equation (1), on account of a decreasing temperature, the reaction equilibrium is shifted in favor of the reaction products, i.e., in favor of the formation of elemental sulfur. In this reactor, there is no need for a COS or $CS_2$ hydrolysis. One of the numerous Claus catalysts of the prior art can be used as the catalyst in the Claus reactor. The addition of air or $O_2$ into the thermal Claus stage can be regulated by means of an ADA so that there is a ratio of $H_2S$ to $SO_2$ of 2:1 in the Claus reactor. There can also be a slight excess of $H_2S$ to prevent the formation of sulfate on the Claus catalyst.

The gas extracted from the catalytic Claus stage is freed of elemental sulfur in a sulfur condenser. The Claus tail gas from the single-stage Claus installation is mixed with a reducer gas and transported to a hydrogenation reactor. In addition to a hydrogenation of the sulfur compounds such as $SO_2$ into $H_2S$, a hydrolysis of COS and/or $CS_2$ can also be performed in the reactor, if necessary. The result is that practically all of the sulfur compounds contained in the Claus tail gas are converted into $H_2S$ in the hydrogenation reactor. Catalysts of the prior art can be used as the catalyst for the hydrogenation or hydrolysis of the sulfur components into $H_2S$. It has been determined that catalysts which contain cobalt and molybdenum are particularly well-suited for use in this process. Such a catalyst is known from the BSR/SELECTOX Method, for example. The reducer gas is advantageously generated by a substoichiometric combustion of a fuel gas and air or oxygen.

Following the hydrogenation, the major portion of the reaction water contained in the Claus tail gas is removed by cooling. After the reaction water has been removed from the hydrogenated Claus tail gas, the Claus tail gas, with the stoichiometric admixture of air or oxygen, is converted in a direct oxidation reactor into elemental sulfur as described in Equation (2). All of the suitable catalysts of the prior art can be used for this catalytic deoxidation of the $H_2S$ into elemental sulfur. It has been determined that catalysts which contain $TiO_2$ as an active component are particularly well-suited for the direct oxidation. Such a catalyst is disclosed, for example, in U.S. Pat. No. 4,552,746.

Because the $H_2S/O_2$ ratio is altered by the addition of air or $O_2$ upstream of the direct oxidation reactor and air or $O_2$ is also added upstream of the hydrogenation step, a non-optimal setting of the ratio of raw gas/air or of the raw gas/$O_2$ ratio in the Claus furnace caused by this addition of air or $O_2$ upstream of the hydrogenation step can be eliminated by the ADA.

In the method according to the invention, a sulfur recovery rate of 92% to 96% can be achieved in the single-stage Claus installation and a sulfur recovery rate of 92% to 94% can be achieved in the direct oxidation reactor. That means that the total sulfur recovery rate of the method is between 99.3% and 99.6%, as a long-term average. It is particularly surprising that this high sulfur recovery rate can be achieved in a simple method with a total of only three reactors. The method of the invention is characterized by precisely this simplicity, since comparable sulfur recovery rates have heretofore been achieved only by using more complicated and, above all, significantly more expensive methods.

The invention teaches that it is particularly advantageous to use an internally-cooled reactor as the direct oxidation reactor. This feature makes a precise control of the temperature of the direct oxidation reactor possible. While in adiabatically operated reactors the temperatures in the direct oxidation reactor are significantly influenced by the strongly exothermal nature of the direct oxidation according to Equation (2) and the temperature can only be controlled by adjusting the temperature of the Claus tail gas and/or of the air or oxygen injected, an internally-cooled reactor permits precise adjustment and control of the temperature in the reactor. In particular, in an internally-cooled reactor, it is possible to set and control a temperature profile in the direction of flow. The direct oxidation reactor can also contain an uncooled catalyst layer in the inflow area, so that the reactor is equipped for catalytic direct oxidation in the direction of flow with an adiabatically-operated preliminary layer of catalyst. In that case, however, the adiabatic preliminary layer should contain less than 50%, and preferably between 15% and 30%, of the total volume of catalyst in the direct oxidation reactor.

In one embodiment of the invention for catalytic direct oxidation, the catalyst is uniformly distributed in the reactor wherein coiled heat exchanger tubes are embedded for internal cooling. The above-mentioned CLINSULF reactor is one example of such a reactor. An internally-cooled reactor with coiled heat exchanger tubes has particular advantages over other internally-cooled reactors in which straight tubes filled with catalyst are used. Feedwater under high pressure, which is conventionally used to cool the reactor, is transported into the coiled tubes and consequently does not place any stress on the shell of the reactor. Therefore, the reactor shell can be made of relatively thin sheet metal, which on one hand reduces the capital investment costs and, on the other hand, increases safety since only the small volume contained inside the heat exchanger tubes is under high pressure. Furthermore, a uniform gas distribution over the entire cross section of the reactor is significantly easier to achieve than when the catalyst is in straight tubes. As a result of the coiled heat exchanger tubes, different ratios between the heat exchanger surface area and the catalyst volume can also be realized. The density of the heat exchanger surface areas can be selected so that it has different values in different sections of the reactor. It thereby becomes possible to optimally adjust the heat exchanger surface area to the generation of heat expected in the reactor. Finally, an increasing or decreasing temperature difference between the gas phase and the heat exchanger tubes results in an increase or decrease in heat transfer. As a result of this automatic regulation, the reactor outlet temperature also keeps the sulfur recovery rate for the direct oxidation process at a constantly high value, even if sharp fluctuations occur in the amount and/or in the composition of the Claus tail gas upstream of the direct oxidation reactor.

The catalytic direct oxidation according to the invention is preferably conducted at temperatures up to approximately 400° C., preferably between about 250° C. and 300° C., with a particularly preferred temperature range between 280° C. and 300° C., at the hottest point of the reactor. When the temperature exceeds approximately 300° C., instead of the oxidation of the $H_2S$ into elemental sulfur, the undesirable combustion of the $H_2S$ begins, which leads primarily to the formation of $SO_2$ and thus to a reduction of the sulfur yield. Therefore, an optimal selectivity to elemental sulfur recovery rate is achieved at a maximum temperature in the direct oxidation reactor up to approximately 300° C. At maximum temperatures in the range above 300° C. to approximately 400° C., a combustion of the $H_2S$ into $SO_2$ begins, but the sulfur recovery rate remains higher than in a Claus reactor. The temperature at the reactor output can be maintained slightly above the sulfur dew point, with the temperature of the sulfur dew point being determined by the sulfur concentration in the Claus tail gas and by the pressure in the direct oxidation reactor.

The dehydration step is advantageously performed following the hydrogenation step of the Claus tail gas by means of quench cooling in a quench cooler.

The tail gas which is extracted from the sulfur condenser installed downstream of the reactor for the catalytic direct oxidation still contains small amounts of sulfur compounds. The tail gas is therefore preferably injected into an afterburner. This setup guarantees that any sulfur components which may be contained in the tail gas are transformed into $SO_2$, which is comparatively less polluting than $H_2S$.

The internally-cooled reactor can be constructed for gas throughputs of approximately 500 to 50,000 $Nm^3/h$. For use as a reactor for catalytic direct oxidation downstream of a one-stage Claus plant receiving the typical feed of approximately 90 vol. % $H_2S$ that throughput corresponds to a maximum sulfur capacity of approximately 500 tons per day.

In general, conventional Claus installations can only be operated profitably and with the required sulfur recovery rate if the $H_2S$ concentration of the acid gas fed into the Claus installation has a value of at least of 50%. But in addition to the range of high $H_2S$ concentrations known in the prior art, the method of the invention can also be used with low $H_2S$ concentrations in the Claus raw gas. If the Claus raw gas has an $H_2S$ concentration of 15% to 45%, 40% to 66% of the Claus raw gas is advantageously transported via a bypass around the thermal Claus stage directly into the catalytic Claus stage. In one embodiment of the invention, at an $H_2S$ concentration in the acid gas of less than 15%, the thermal and the catalytic Claus stages are replaced by a catalytic direct oxidation stage. In the latter case, therefore, a first direct oxidation reactor is provided upstream of the hydrogenation step and a second direct oxidation reactor is provided downstream of the hydrogenation stage. For this additional direct oxidation reactor, a mode of operation and equipment can be selected as explained above in relation to the direct oxidation reactor downstream of the hydrogenation stage.

Since only one single catalytic Claus stage is required in the method of the invention, the method is suitable for the conversion of existing Claus installations with the goal of increasing the sulfur recovery rate. For the conversion, the second and third catalytic Claus stages, if any, are taken out of operation which guarantees the pressure gradient required as the gas passes through the direct oxidation reactor.

A complete understanding of the invention will be obtained from the following description when taken in connection with the accompanying drawing figure wherein like reference characters identify like parts throughout.

BRIEF DESCRIPTION OF THE DRAWING

The drawing is a schematic flow diagram of an apparatus including a Claus installation for recovery of elemental sulfur according to the method of the invention.

DESCRIPTION OF A PREFERRED EMBODIMENT OF THE INVENTION

As shown in the drawing, an acid gas containing, for example, 80 vol. % $H_2S$ is supplied to a one-stage Claus installation 2 by line 1. The Claus installation 2 is designated by a chain line. Air or oxygen from a line 3 is fed by a line 4, together with the gas from line 1, into a Claus furnace 5. Approximately ⅓ of the $H_2S$ contained in the acid gas 1 is burned to give $SO_2$ in Claus furnace 5. Feedwater in a line 6 is heated in a heat exchanger by the hot Claus gas, resulting in steam under medium pressure in a line 7. Elemental sulfur is extracted by a line 8.

Claus gas is injected through a line 9 into a sulfur condenser 10 where elemental sulfur is condensed and extracted by a line 11. The cooling in the sulfur condenser 10 is performed by feedwater supplied by line 12, which feedwater is supplied to line 13 as low pressure steam following heating in sulfur condenser 10. Downstream of sulfur condenser 10, the Claus gas in line 14 is heated in an indirect heat exchanger 15 by medium pressure steam and is transported into a catalytic Claus reactor 16, where the Claus reaction takes place, resulting in a reaction of $H_2S$ with $SO_2$ to form elemental sulfur. The gas is extracted from the Claus reactor 16 by line 17 and is fed into a second sulfur condenser 18 wherein feedwater 19 is converted into low pressure steam and is discharged into line 20. Elemental sulfur is discharged in line 21 and the Claus tail gas is discharged in line 22.

In the illustrated embodiment, the Claus tail gas in line 22 still has a sulfur content of approximately 1 to 3 vol. %. Such a sulfur content in the Claus tail gas in line 22 is possible with one-stage Claus installation 2 because the gas mixture in line 14 is heated in heat exchanger 15 until the catalyst bed of Claus reactor 16 at the outlet reaches a temperature which is slightly above the sulfur dew point. In contrast to the direct oxidation described in Equation (2), the Claus reaction described in Equation (1) is strongly temperature-dependent. The conversion into elemental sulfur in Claus reactor 16 therefore occurs at a particularly high rate at selected temperatures which are slightly above the sulfur dew point, without sulfur condensing out in the reactor and potentially interfering with flow through the reactor.

A fuel gas, for example, natural gas, is supplied to a burner 25 by a line 23 and air or oxygen is supplied by a line 24 for the generation of a hydrogenation gas. The mixture of hydrogenation gas and Claus tail gas is fed into a reactor 27 by a line 26. In reactor 27, a hydrogenation of the sulfur compounds, primarily $SO_2$, takes place into $H_2S$. If the Claus tail gas in line 22 also contains COS and/or $CS_2$, these substances are also converted by means of hydrolysis into $H_2S$. The hydrogenated Claus tail gas in line 28 is cooled in a heat exchanger 29 by indirect heat exchange and is supplied to a quench cooler 30. The hydrogenated Claus tail gas is further cooled in quench cooler 30 by direct heat exchange with cooler water from line 31 so that water is removed from the hydrogenated Claus tail gas by a line 32. A portion of the water condensed in line 32 is pumped through a line 33 following indirect cooling in heat exchanger 34 by cooling water supplied by line 35 through a line 31 into quench cooler 30 while the other part of the condensate is removed from line 32 by a line 36. Hydrogenated Claus tail gas which has been essentially dehydrated is extracted from the top of the quench cooler 30 by a line 37 and is heated in heat exchanger 29 by the hot, hydrogenated Claus tail gas supplied by line 28.

Following heating in heat exchanger 29, the hydrogenated and dehydrated Claus tail gas in line 37 is mixed in a line 38 with the amount of air or $O_2$ stoichiometrically appropriate for direct oxidation and is supplied to a reactor 39 for catalytic direct oxidation. Direct oxidation reactor 39 is indirectly cooled with feedwater supplied by line 40, whereby a temperature below 300° C., for example, 290° C., exists at the hottest point of the reactor and 230° C. is the temperature at the reactor outlet. The gas extracted from direct oxidation reactor 39 through line 41 is transported to an additional sulfur condenser 42. Sulfur condenser 42 is cooled by feedwater supplied by line 43 which is converted by heat exchange into low pressure steam which is discharged to line 44. Elemental sulfur condensed in sulfur condenser 42 is extracted by a line 45. In direct oxidation reactor 39, more than 90%, e.g., 95%, of the residual sulfur contained in the Claus tail gas in line 37 is converted into elemental sulfur and is recovered through line 45.

The Claus tail gas from which the elemental sulfur has been removed can be transported in a line 46, for example, to an afterburner (not shown).

In total, using the method illustrated in the drawing, a long-term average of between 99.3% and 99.6%, e.g., 99.5%, of the sulfur contained in the acid gas line 1 is recovered in line 47 in the form of elemental sulfur.

While an embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

We claim:

1. A method for the recovery of elemental sulfur from a gas mixture containing $H_2S$, comprising the steps of:
   passing said gas mixture through a Claus installation having a thermal stage and a single catalytic stage to produce elemental sulfur and a Claus tail gas containing sulfur compounds;
   operating said Claus single catalytic stage with an excess of $H_2S$;
   recovering said elemental sulfur from said Claus installation;
   hydrogenating said sulfur compounds in said Claus tail gas to produce a hydrogenated tail gas containing $H_2S$;
   passing said hydrogenated tail gas through a single catalytic direct oxidation reactor to produce a catalytic direct oxidation of said $H_2S$ to elemental sulfur;
   internally cooling said catalytic direct oxidation reactor;
   carrying out the catalytic direct oxidation at a temperature below about 400° C. at the hottest point of said catalytic direct oxidation reactor;
   maintaining a temperature above the sulfur dew point at an output of said catalytic direct oxidation reactor;
   recovering said elemental sulfur from said catalytic direct oxidation reactor; and
   inputting the tail gas from said catalytic direct oxidation into an afterburner following separation of the elemental sulfur from said catalytic direct oxidation reactor.

2. The method as claimed in claim 1, including uniformly distributing said catalyst in said catalytic direct oxidation reactor and wherein coiled heat exchanger tubes are at least partly embedded in said catalyst.

3. The method as claimed in claim 1, including quench cooling said hydrogenated Claus tail gas to remove water therefrom.

4. The method as claimed in claim 1, including transporting 40% to 66% of said gas mixture around said thermal stage to said catalytic stage by a bypass when said gas mixture has an $H_2S$ concentration between 15% and 45%.

5. The method as claimed in claim 1, including converting COS and $CS_2$ compounds contained in said Claus tail gas into $H_2S$ by means of hydrolysis.

6. The method as claimed in claim 1, wherein said catalytic direct oxidation reactor contains an adiabatic preliminary catalyst layer occupying about 15% to about 30% of the total volume of the catalyst in said catalytic direct oxidation reactor.

7. The method as claimed in claim 1, including the steps of uniformly distributing a catalyst in said catalytic direct oxidation reactor, and partly embedding heat exchanger tubes in said catalyst.

8. The method as claimed in claim 1, wherein said catalytic direct oxidation is carried out at a temperature in a range between about 250° C. and about 300° C. at the hottest point of said reactor.

9. The method as claimed in claim 1, including quench cooling said hydrogenated tail gas to remove water therefrom.

10. The method as claimed in claim 1, including transporting 40% to 66% of said gas mixture around said thermal stage to said catalytic stage when said gas mixture has an $H_2S$ concentration between 15% and 45%.

\* \* \* \* \*